(12) United States Patent
Walker et al.

(10) Patent No.: US 10,482,148 B2
(45) Date of Patent: Nov. 19, 2019

(54) SYSTEMS AND METHODS FOR CO-BROWSING

(71) Applicant: Capital One Services, LLC, McLean, VA (US)

(72) Inventors: Byron Romon Walker, Anna, TX (US); Connor Thomas Marcum, Little Elm, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 7 days.

(21) Appl. No.: 15/833,600

(22) Filed: Dec. 6, 2017

(65) Prior Publication Data

US 2019/0171770 A1    Jun. 6, 2019

(51) Int. Cl.
*G06F 17/00* (2019.01)
*G06F 16/954* (2019.01)
*G06F 17/22* (2006.01)

(52) U.S. Cl.
CPC .......... *G06F 16/954* (2019.01); *G06F 17/227* (2013.01); *G06F 17/2247* (2013.01)

(58) Field of Classification Search
CPC . G06Q 10/10; G06F 3/0484; G06F 17/30873; G06F 17/2247; G06F 17/227; G06F 17/30893; G06F 17/30923; G06F 16/954; G06F 17/30575; G06F 9/544; G06F 17/24
USPC ....................................................... 715/234
See application file for complete search history.

(56) References Cited

U.S. PATENT DOCUMENTS

| | | |
|---|---|---|
| 7,149,776 B1 | 12/2006 | Roy et al. |
| 7,219,072 B1 | 5/2007 | Sundaresan |
| 8,015,496 B1 | 9/2011 | Rogers |
| 9,690,764 B1 * | 6/2017 | Batni ................... G06F 17/227 |
| 9,792,266 B1 * | 10/2017 | Armstrong .......... G06F 17/2247 |
| 9,971,826 B1 * | 5/2018 | Belmar .................. G06F 9/544 |
| 2002/0198941 A1 | 12/2002 | Gavrilescu et al. |
| 2004/0003043 A1 * | 1/2004 | Rajamony ......... G06F 17/30873 709/205 |
| 2008/0052377 A1 | 2/2008 | Light |
| 2008/0276183 A1 | 11/2008 | Siegrist et al. |
| 2009/0037517 A1 * | 2/2009 | Frei ................... G06F 17/30893 709/202 |
| 2009/0271713 A1 * | 10/2009 | Stull ..................... G06Q 10/10 715/753 |
| 2010/0306642 A1 | 12/2010 | Lowet et al. |
| 2011/0191431 A1 * | 8/2011 | Noguchi ................ G06F 15/16 709/206 |
| 2013/0332813 A1 * | 12/2013 | Heinrich ............ G06F 17/2247 715/234 |
| 2014/0067819 A1 * | 3/2014 | Novoselsky ...... G06F 17/30923 707/741 |

(Continued)

*Primary Examiner* — Jason T Edwards
(74) *Attorney, Agent, or Firm* — Troutman Sanders LLP; Christopher J. Forstner; John A. Morrissett

(57) ABSTRACT

The present disclosed technology relates to systems and methods for synchronizing the website displayed by two computing devices. Embodiments of the disclosed technology include methods for transmitting the contents of a Document Object Model displayed on a customer device to a customer service device. Embodiments of the disclosed technology further include methods to transmit Shadow DOM elements from a customer device to a customer service device.

18 Claims, 10 Drawing Sheets

(56) References Cited

U.S. PATENT DOCUMENTS

| | | | | |
|---|---|---|---|---|
| 2014/0129920 A1* | 5/2014 | Sheretov | ............ | G06F 17/2247 |
| | | | | 715/234 |
| 2014/0157108 A1* | 6/2014 | Schmidt | ............. | G06F 17/2247 |
| | | | | 715/234 |
| 2015/0149916 A1* | 5/2015 | Mendez | ............ | G06F 17/30873 |
| | | | | 715/738 |
| 2015/0248468 A1* | 9/2015 | Cheng | ................. | H04L 67/1095 |
| | | | | 707/621 |

* cited by examiner

SYSTEMS AND METHODS FOR CO-BROWSING

FIELD OF INVENTION

The present disclosed technology relates to systems and methods for synchronizing a website displayed by two computing devices.

BACKGROUND

There is often a need for two users in remote locations on two separate computing devices to view content simultaneously to, for example, facilitate a demonstration or provide support to a customer. This is commonly known as "screen-sharing," or "co-browsing." In some cases, co-browsing can be accomplished by taking screenshots of the content shown at a customer device, and delivering the images to a customer service device, where they are displayed. Where web technologies are used, including a Document Object Model (DOM), a co-browsing system can instead operate by duplicating the contents of the DOM displayed by the customer device on the customer service device. As discussed herein, aspects of the present disclosed technology can implement a DOM-based co-browsing system. In some embodiments, the disclosed technology can even function where the DOM displayed on the Customer Device contains elements embedded in Shadow DOM's, as discussed herein.

The architecture of the World Wide Web (Web) follows a conventional client-server model. The terms "client" and "server" are used to refer to a computer's general role as a requester of data (the client) or provider of data (the server). Under the Web environment, Web browsers reside in clients and specially formatted "Web documents" reside on web servers. Web clients and Web servers communicate using a protocol called the Hyper Text Transfer Protocol (HTTP). In operation, a browser opens a connection to a server and initiates a request for a document or a Web page that includes content. The server delivers the requested document or Web page, typically in the form coded in a standard Hyper Text Markup Language (HTML) format. After the document or Web page is delivered, the connection is closed and the browser displays the document or Web page to the user.

To define the addresses of resources on the Internet, a Uniform Resource Locator system was created that uses a Uniform Resource Locator (URL) as a descriptor that specifically defines a type of Internet resource and its location. URLs have the following format: "resource-type://domain-.address/path-name." The "resource-type" defines the type of Internet resource. Web documents, for example, are identified by the resource type "http", which indicates the protocol used to access the document.

To access a document on the Web, the user enters a URL for the Web document into a browser program executing on a client system with a connection to the Internet. The Web browser then sends a request in accordance with the HTTP protocol to the Web server that has the Web document using the URL. The Web server responds to the request by transmitting the requested object to the client. In most cases, the object is a plain text document containing HTML.

Once a web browser receives the HTML, it renders the HTML to present to the user. The HTML may reference other resources necessary to render the HTML, such as images, video, and other media, as well as style information, and script code. The style information can comprise a separate Cascading Style Sheet (CSS) document that contains information about how the HTML document should be styled, or the style information can be directly embedded in the HTML code. Similarly, the script code can be embedded in the HTML document, or sent as a separate file, such as a Javascript file. The browser then downloads all the resources referenced by the HTML, and renders the web page.

Modern websites frequently leverage HTML, CSS, and Javascript to create highly dynamic content, commonly referred to as a "Web Application." The HTML defines the overall structure of the webpage, and CSS defines the style information for how the document is displayed. Javascript can provide interactivity, and can dynamically change the contents of webpage. However, there is no discernable line between "web pages" and "web applications," and both terms are used synonymously herein.

Disclosed herein is a method for co-browsing that takes advantage of the DOM used in web technologies. That is, web applications are rendered by browsers as a tree of elements. These elements can contain text, tables, images, and other content. Modern web applications can change the document viewed by a user by adding, updating, or deleting elements from the DOM. In a co-browsing context, while the view seen by the customer device and the customer service device will initially be the same for a given web request, this dynamic content can cause the content shown at the customer device to differ from the content shown at the customer service device.

Further, modern application software can take advantage of these technologies as well. For example, the Electron™ framework allows desktop applications to be built using this same technology. While some embodiments of the present technology include co-browsing web applications retrieved from the internet, other embodiments can be used to co-browse a desktop application built on web technologies, so long as the desktop software includes a component that implements a data structure similar to the DOM. As used herein, the terms "Web Page" and "Web Application" include applications that implement a data structure similar to the DOM.

As web applications grow in size and complexity, it can be useful to decompose the web application into smaller discrete components. Decomposed web applications can be easier to maintain, easier to divide responsibilities across engineering teams, and can facilitate re-use of common components. Further, modern HTML standards often allow for tag types that require custom implementations by browsers, such as a <video> tag to display a video. To facilitate this decomposition, modern internet browsers can implement a set of standards called "Web Components" that allow developers to write reusable components to build web pages and web applications. To provide backward compatibility, libraries also exist to provide Web Components services on otherwise incompatible browsers through the use of polyfills, which are software libraries that emulate the functionality of features unavailable on certain browsers.

Web Components includes a feature called a "Shadow DOM." A Shadow DOM is a type of sub-document that can be encapsulated and attached to an element of an HTML page. In general, two types of Shadow DOM's exist: "open" and "closed." Open Shadow DOM's are accessible to web applications, which can view, edit, and delete any element within the Shadow DOM, as well as the Shadow DOM itself. Closed Shadow DOM's are not accessible to web applications, but are viewable by a user. A web application searching for closed Shadow DOM's will neither see the existence of the Shadow DOM itself, nor any of the elements within the Shadow Dom. However, the "open" and "closed" behavior of Shadow DOM's is implemented by a browser, and a browser can be configured to modify the behavior of Shadow DOM's to, for example, allow web applications to access closed Shadow DOM's.

The existence of Shadow DOM's can require added complexity to methods for co-browsing. In particular, automatic traversal of the DOM using standard tools will frequently not identify the existence of a Shadow DOM, or the elements contained therein. Further, due to the dynamic nature of Web Applications, methods are necessary to identify changes to the DOM rendered by the Web Browser to synchronize the web page rendered at the customer's device and the customer service device. While mutation observer software elements can detect changes to the primary DOM, they frequently are unable to identify changes in the Shadow DOM, leading to differences displayed between the web application viewed at the customer device, and the web application viewed at the customer service device.

SUMMARY OF THE INVENTION

Aspects of the disclosed technology includes a method for co-browsing, comprising the steps of identifying an element of a document rendered in a browser that contains a shadow root with a shadow element, transmitting identifying information of the element and a copy of the shadow element to a process outside the browser, and transmitting, in response to a change in the shadow element, identifying information of the shadow element and shadow element change information describing the change in the shadow element.

In some embodiments, the identifying information of the element is an identification number in a custom attribute, the method further comprising adding, to each element in the document, a custom attribute having a unique identification number. In some embodiments, the step of transmitting identifying information of the shadow element is performed in response to detecting a change via a Mutation Observer attached to the shadow root. In some embodiments, the step of identifying the element of the document comprises traversing a document tree of the document and inspecting the elements of the document tree for elements that contain the shadow root. In some embodiments, the step of transmitting identifying information of the element and the copy of the shadow element comprises sending data through a Web-Sockets connection. In some embodiments, the step of transmitting identifying information of the element and the copy of the shadow element comprises sending data via an AJAX request.

Aspects of the disclosed technology include a method for co-browsing, comprising the steps of transmitting a document rendered by a browser to a remote computer, identifying a plurality of elements of the document that contain a shadow root, attaching a mutation observer to the shadow root of each of the identified elements containing a shadow root, aggregating changes detected by the shadow root mutation observers for elements contained in the shadow root; and transmitting modification information comprising identifying information for the identified elements and change information associated with the changes detected by the shadow root mutation observers for the elements contained in the shadow root.

In some embodiments, the step of identifying the plurality of elements of the document comprises inspecting each node in the document to determine if the element contains a shadow root. In some embodiments, the step of aggregating changes comprises providing a callback function to each of the shadow root mutation observers to add observed mutations to a queue.

In some embodiments, the method can include adding a reference to the first element of the plurality of elements containing a shadow root and a reference to a first shadow root mutation observer of the shadow root mutation observers. In some embodiments, the step of transmitting modification information comprises transmitting a string containing a modified html element and all child elements of the modified html element. In some embodiments, the step of aggregating changes comprises polling each of the shadow root mutation observers for modification information, and adding obtained modification data to a queue. In some embodiments, the step of transmitting modification information comprises periodically transmitting the obtained modification data in the queue to a remote server. In some embodiments, a method can further comprise attaching a mutation observer to the root of the document; and in response to detecting a change via the document root mutation observer, repeating the step of identifying the plurality of elements of the document containing a shadow root. In some embodiments, the step of transmitting modification information further comprises transmitting changes made to all elements in the document. In some embodiments, the step of identifying a plurality of elements of the document that contain a shadow root comprises performing a depth-first search of the document object model tree. In some embodiments, the identifying a plurality of elements of the document that contain a shadow root comprises performing a breadth-first search of the document object model tree.

Aspects of the disclosed technology include a method for co-browsing, comprising the steps of transmitting a software module from a server to a first remote computing device, wherein the software module causes a browser at the remote computing device to perform the steps of transmitting a document rendered by the browser running on the first remote computer to a second remote computing device, identifying a plurality of elements of the document that contain a shadow root, attaching a mutation observer to the shadow root of each of the identified elements containing a shadow root, aggregating changes detected by the shadow root mutation observers for elements contained in the shadow root; and transmitting modification information comprising identifying information for the identified elements and change information associated with the changes detected by the shadow root mutation observers for the elements contained in the shadow root.

In some embodiments, the step of identifying the plurality of elements of the document comprises inspecting each node in the document to determine if the element contains a shadow root. In some embodiments, the step of aggregating changes comprises providing a callback function to each of the shadow root mutation observers to add observed mutations to a queue.

Aspects of the disclosed technology include a method for co-browsing, comprising the steps of receiving a document rendered by a remote browser to a computing device, rendering the document at the computing device, receiving information from the browser comprising identifying information for a first element containing a first shadow root on the remote browser, and the contents of the first shadow root, identifying a corresponding element in the document at the computing device, and updating the document such that the corresponding element comprises a second shadow root and contains the contents of the first shadow root.

In some embodiments, the step of receiving information further comprises subscribing to a web service and receiving push notifications containing the information. In some embodiments, the information from the browser is received via a WebSockets connection.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to exemplary embodiments of the disclosed technology, examples of which are illustrated in the accompanying drawings and disclosed herein. Wherever convenient, the same reference numbers will be used throughout the drawings to refer to the same or like parts.

Figure 1:
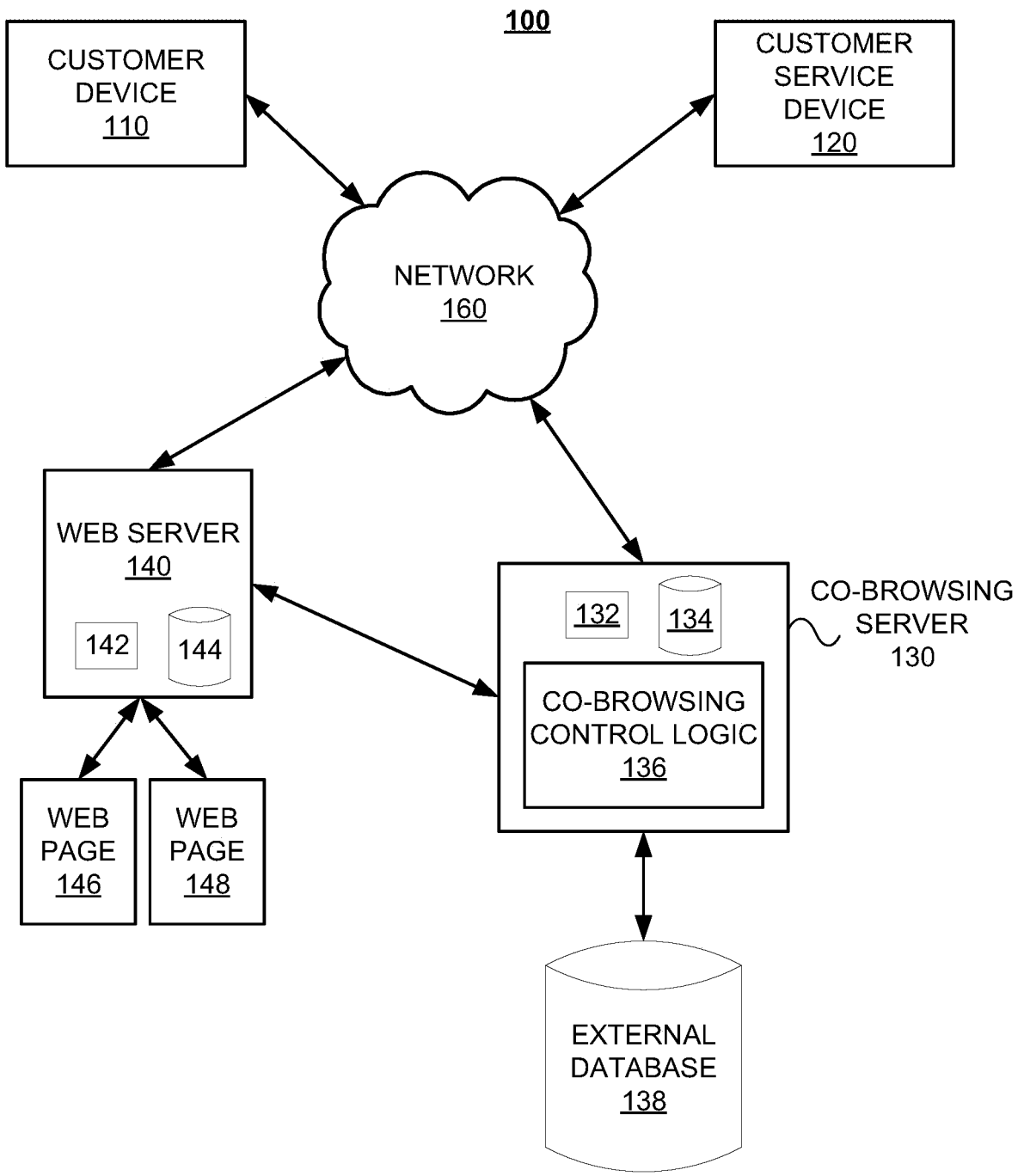
FIG. 1 illustrates a system in accordance with an embodiment of the disclosed technology.

FIG. 1 is a diagram of an exemplary system that may be configured to perform one or more processes in accordance with an embodiment. The components and arrangements shown in FIG. 1 are not intended to limit the disclosed embodiments as the components used to implement the disclosed processes and features may vary.

In accordance with disclosed embodiments, a co-browsing system 100 may include a Customer Device 110 and a Customer Service Device 120. A co-browsing system can further include one or more Web Servers 140 with processing units 142 and data storage 144 for providing one or more webpages 146, 148. A co-browsing system may further include a Co-Browsing Server 130 with a processing unit 132, and data storage 134, configured to execute co-browsing control logic 136. Devices 110 and 120 may be a mobile computing device (e.g., a smart phone, tablet computer, smart wearable device, portable laptop computer, voice command device, wearable augmented reality device, or other mobile computing device). In some embodiments, the Co-Browsing Server 130 may further comprise an external database 138.

Web Server 140 and Co-Browsing Server 130 may be associated with an entity such as a business, corporation, individual, partnership, or any other entity that may be a seller of good and/or services such as a grocery store, a movie theater, a gas station, or the like. According to some embodiments, the organization may be associated with an entity such as a business, corporation, individual, partnership, or any other entity that may provide financial services or processing of financial transactions such as a bank, a credit card company or the like. According to some embodiments, the organization may be associated with an entity that provides goods and services. In some embodiments, Web Server 140 and Co-Browsing Server 130 may be associated with the same or related entities. In some embodiments, the Co-Browsing Server can be associated with a different organization from Web Server 140, such as a customer service vendor.

Network 160 may be of any suitable type, including individual connections via the internet such as cellular or WiFi networks. In some embodiments, network 160 may connect terminals using direct connections such as radio-frequency identification (RFID), near-field communication (NFC), Bluetooth™, low-energy Bluetooth™ (BLE), WiFi™, ZigBee™, ambient backscatter communications (ABC) protocols, USB, Ethernet, or LAN. In some embodiments, data can be transmitted across the network in either an encrypted or un-encrypted format.

Figure 2:
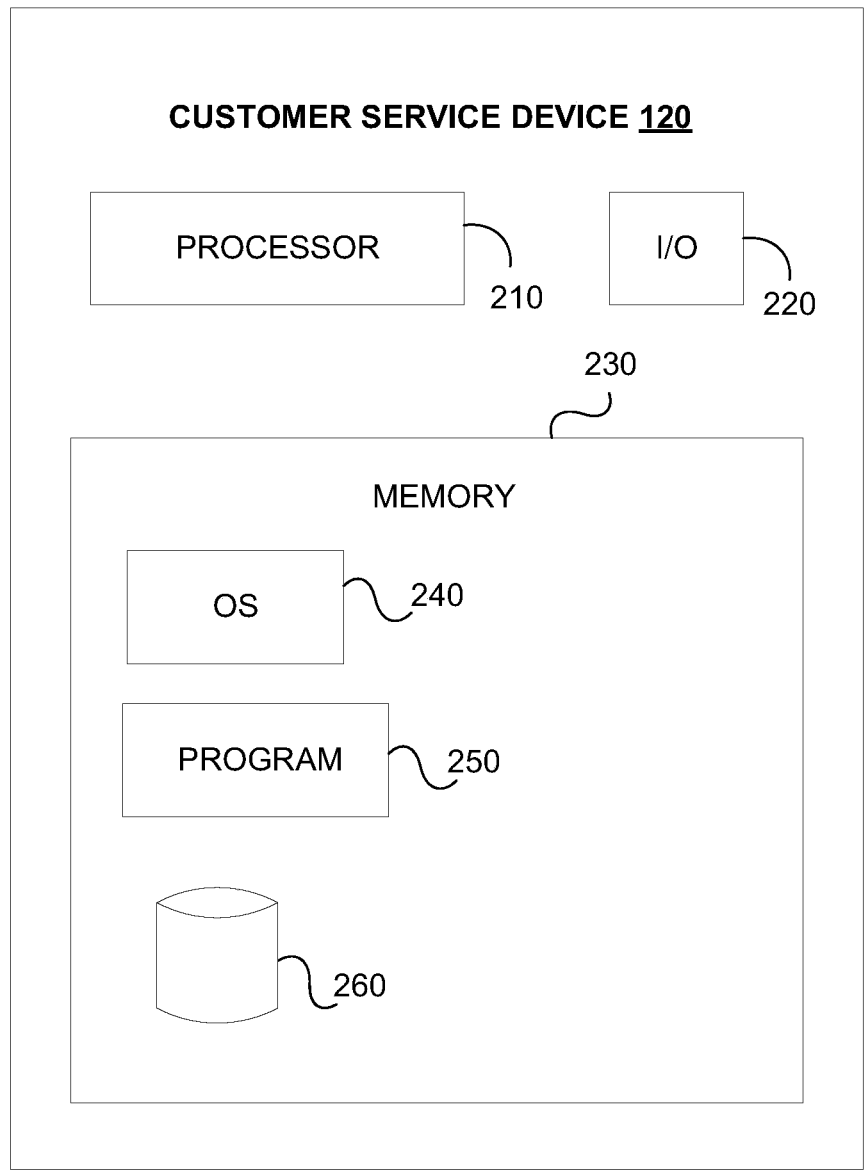
FIG. 2 illustrates a customer service device.

An exemplary embodiment of a Customer Service Device 120 is shown in more detail in FIG. 2. Customer Service Device 120 may have a similar structure and components that are similar to those described with respect to Customer Device 110. As shown, Customer Service Device 120 may include a processor 210, an input/output ("I/O") device 220, a memory 230 containing an operating system ("OS") 240 and a program 250. For example, Customer Service Device 120 may be a single server or may be configured as a distributed computer system including multiple servers or computers that interoperate to perform one or more of the processes and functionalities associated with the disclosed embodiments. In some embodiments, Customer Service Device 120 may further include a peripheral interface, a transceiver, a mobile network interface in communication with processor 210, a bus configured to facilitate communication between the various components of Customer Service Device 120, and a power source configured to power one or more components of Customer Service Device 120.

Processor 210 may be one or more known processing devices, such as a microprocessor from the Pentium' family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft® SQL databases, SharePoint® databases, Oracle® databases, Sybase™ databases, Postgres, MariaDB®, Couchbase™, Redis™, MongoDB® or other relational or non-relational databases. Memory 230 may include software components that, when executed by processor 210, perform one or more processes consistent with the disclosed embodiments.

Network 160 can comprise a mobile network interface that provides access to a cellular network, the Internet, or another wide-area network. In some embodiments, a mobile network interface may include hardware, firmware, and/or software that allows processor(s) 210 to communicate with other devices via wired or wireless networks, whether local or wide area, private or public, as known in the art. A power source may be configured to provide an appropriate alternating current (AC) or direct current (DC) to power components.

As described above, Customer Service Device 120 may be configured to remotely communicate with one or more other devices, such as Customer Device 110, or Co-Browsing Server 130. Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Customer Service Device 120 may include one or more storage devices configured to store information used by processor 210 (or other components) to perform certain functions related to the disclosed embodiments. In one example, Customer Service Device 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, Customer Service Device 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, Customer Service Device 120 may include memory 230 that may include one or more programs 250 to perform one or more functions of the disclosed embodiments. Moreover, processor 210 may execute one or more programs 250 located remotely from Customer Service Device 120. For example, Customer Service Device 120 may access one or more remote programs 250, that, when executed, perform functions related to disclosed embodiments.

Customer Service Device 120 may also be communicatively connected to one or more memory devices (e.g., databases (not shown)) locally or through a network. The remote memory devices may be configured to store information and may be accessed and/or managed by Customer Service Device 120. By way of example, the remote memory devices may be document management systems, Microsoft® SQL databases, SharePoint® databases, Oracle® databases, Sybase™ databases, Postgres, MariaDB®, Couchbase™, Redis™, MongoDB® or other relational or non-relational databases. Systems and methods consistent with disclosed embodiments, however, are not limited to separate databases or even to the use of a database.

Customer Service Device 120 may also include one or more I/O devices 220 that may comprise one or more interfaces for receiving signals or input from devices and providing signals or output to one or more devices that allow data to be received and/or transmitted by Customer Service Device 120. For example, Customer Service Device 120 may include interface components, which may provide interfaces to one or more input devices, such as one or more keyboards, mouse devices, touch screens, track pads, trackballs, scroll wheels, digital cameras, microphones, sensors, and the like, that enable Customer Service Device 120 to receive data from one or more users (such as via Customer Device 110).

In exemplary embodiments of the disclosed technology, Customer Service Device 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

In an example implementation, a customer device obtains a web application or page 146, 148 from a web server 140.

As discussed above, the browser reads the HTML of the web page, downloads any additional resources referenced in the HTML, and renders the web page 146, 148 on Customer Service Device 110.

In some embodiments, the web application includes one or more web components. A web component is any software code in a web application having two features. For one, the web component may be at least partially encapsulated from code in other parts of the web application. Consider an example in which the web application is a web page with code that defines particular web page styles (e.g, using CSS) and variables. In various implementations, these styles and/or variables do not intrude into the web component. That is, the web page styles do not directly affect the rendering of the web component, and the web component generally retains control over the definition of variables, even if it contains variables that share the same names as those used in the rest of the web page. In this way, the rendering of the web application is at least partially insulated from the effects of outside code. (The above description of course assumes that the web component is not explicitly coded to allow for the incorporation of outside variables or styles.)

This insulation leads to another feature of a web component, which is that a web component is reusable. That is, the web component can be written once in a particular web page and then instantiated multiple times (e.g., to generate multiple buttons or other web component-based features when the web page is displayed.) Additionally, because the rendered web component is at least partially insulated from styles or variables that are defined outside of the web component, it can easily be copied and embedded in a wide variety of different types of code and applications, while preserving its general functionality.

Generally, web components are programmed in a client-side programming language. An example of such a language is Javascript, although this is not a requirement. Any suitable client-side programming language or software language can also be used.

A web component can be understood to have any of the features of Web Components as defined in a specification issued by the World Wide Web Consortium (W3C). However, it should be appreciated that this application also contemplates web components that depart from this definition. That is, any suitable reusable software that is at least partially encapsulated from surrounding code may also be a web component for the purpose of this application.

Figure 3:
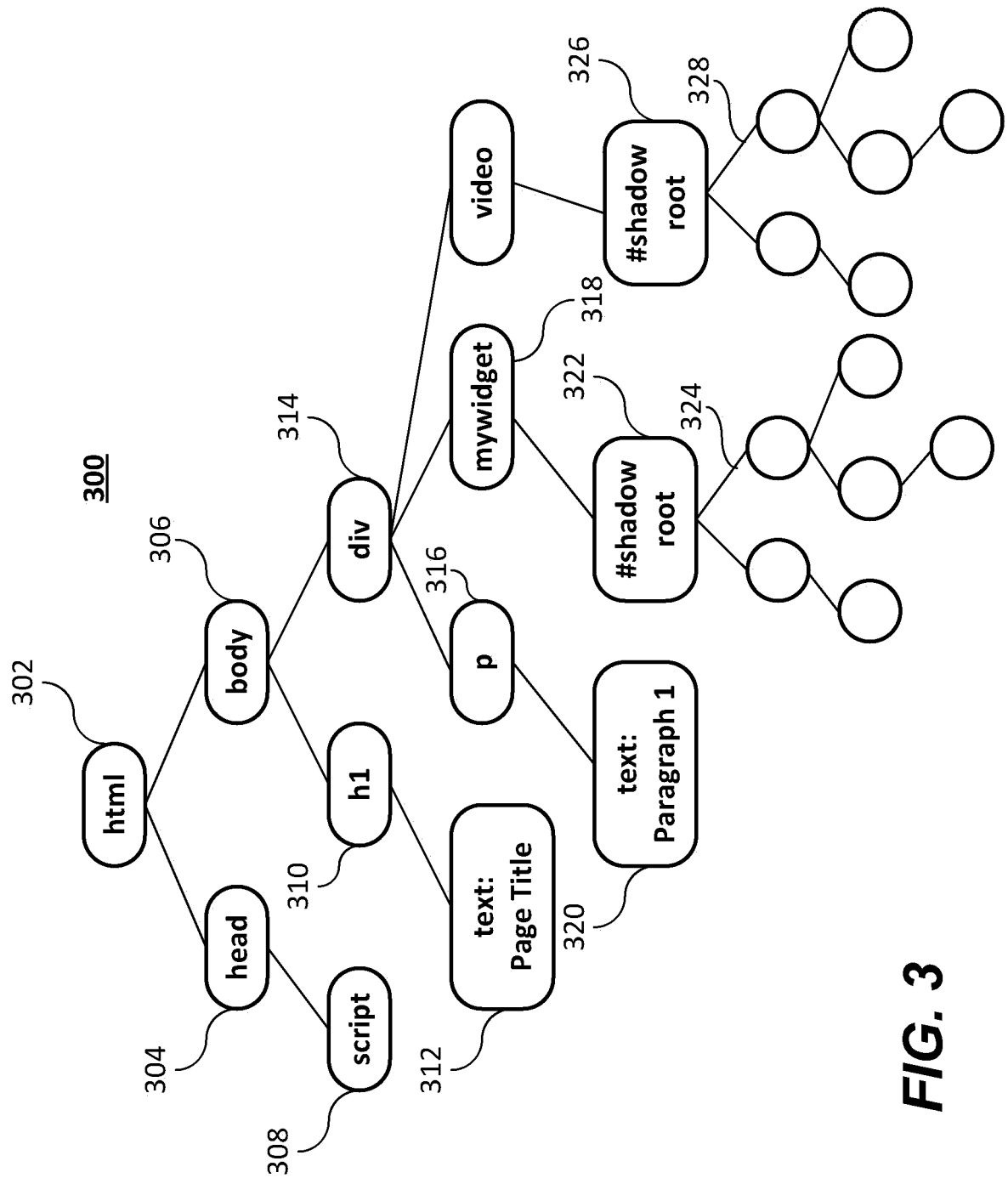
FIG. 3 illustrates a Document Object Model that contains an open shadow root and a closed shadow root.

Returning to FIG. 1, the browser at Customer Device 110 may parse the web component and the web application. When the web application and web component are parsed, the browser builds a DOM tree. An example of a DOM is depicted in FIG. 3. A DOM tree is a mechanism for representing the structure of a document (e.g., a web page, a web application, etc.) The DOM includes multiple nodes that are connected with links. Each node has at least one parent node, and can have one or more child nodes. One node, known as the "root node," does not have any parent nodes, and is the highest ancestor of all other nodes. Each node may represent an object or element in the document. The links between the nodes help indicate how these objects/elements are organized in the document.

A simplified example of a DOM and a shadow DOM are shown in FIG. 3. In this example, the HTML code rendered is:

```
<html>
    <head>
        <script src="coBrowsing.js" />
    </head>
    <body>
        <h1>Page Title</h1>
        <div>
            <p>Paragraph 1</p>
            <my-widget></my-widget>
            <video width="320" height="240">
                <source src="cool-video.ogg">
            </video>
        </div>
    </body>
</html>
```

When the browser renders the code, it parses into a DOM tree data structure 300. Here, the document root element is an HTML tag 302, with a header tag 304, and a body tag 306. The header tag can include various sub-elements, such as metadata, Javascript files, and style information. Here, as an example, the header tag contains only a script tag 308 which instructs the browser to fetch the script "coBrowsing.js" and run the contents of the script. The body tag 306 contains the main content of the webpage, including a header tag 410 that contains the text "Page Title", and a paragraph tag 316 that contains the text "Paragraph 1".

In addition to these common tags, in some embodiments, users can include user-defined tags that contain custom-designed elements, such as a "my-widget" tag. As a custom element, the my-widget tag contains a shadow root 322, with its own sub-tree of elements that resembles the overall DOM 324. These elements could be further text elements, other elements with their own shadow roots, or any other type of HTML element. In some embodiments, this user-defined tag can use a shadow root that is accessible to the rest of the web application (i.e. "open"). This will allow Javascript components to read and edit the shadow root's document object model 324. Although, the user-defined tag could also be defined as "closed", and therefore generally inaccessible to Javascript components. Further, while most browsers will implement "open" and "closed" shadow DOM's in this way, some may render the web application in a browser that allows Javascript access to closed shadow roots.

Some tags can be implemented by a browser using a shadow root. For example, the HTML5 specification includes a "video" tag that can be used to insert a video player on a webpage. Most modern web browsers render a custom video viewer that is substituted for the video tag. For example, a Chrome video player and a Firefox video player may be dissimilar, but each browser will render a video tag using its own video player implementation. Each browser's implementation can comprise its own document object model to, for example, include a view box, a progress bar, pause/play control, etc. These features can be implemented within "closed" shadow roots. These closed shadow roots are not accessible from Javascript components. Instead, if a Javascript component examines the video tag, it will not see the shadow DOM, or its contents.

It should be noted that the DOM tree does not necessarily strictly represent all the code written for the document and web component. Rather, the DOM tree represents the structure of the document as parsed by the browser. That is, if the document is coded to be dynamic and respond to different events and inputs, any particular DOM tree only represents a single iteration of the document, which may change if other events and inputs are received.

The DOM also serves as an interface for representing and manipulating the document. For example, a developer may wish to insert Javascript into a web document that dynamically modifies a particular part of the document (e.g., that cause a visual change in response to a user action.) A developer can write Javascript code for the web component that references and changes the DOM. When the browser renders the web page, the changes made to the DOM will be reflected in the displayed web page, since the DOM represents the structure of the web page. The DOM thus makes it easier for developer to adjust elements or parts of a document.

Co-browsing between a customer at Customer Device 110 and a customer service agent at Customer Service Device 120 can be accomplished by reproducing, at least in part, the DOM rendered by Customer Device 110 on Customer Service Device 120. In some embodiments, the entire DOM viewed on Customer Device 110 can be reproduced in Customer Service Device 120. In some embodiments, only a portion of the DOM viewed on Customer Device 110 can be reproduced on Customer Service Device 120. In some embodiments, all or a portion of the DOM rendered on Customer Device 110 can be rendered alone, or as a subset of the DOM rendered on Customer Service Device 120. In some embodiments, Customer Service Device 120 can render a user interface that renders the portion of the DOM received from Customer Device 110 in a frame or other element, along with other interface elements.

When a co-browsing session begins, elements of the DOM rendered at Customer Device 110 can be reproduced at Customer Service Device 120. In some embodiments, the DOM is reproduced at Customer Device 110 by transmitting information from Customer Device 110 to Customer Service Device 120 to reproduce a HTTP request that generated the DOM at Customer Device 110, such as transmitting the URL and/or HTTP parameters, cookies, etc. to Customer Service Device 120. Once the HTTP request information is received by Customer Service Device 120, Customer Service Device 120 can make the same HTTP request to produce all or a portion of the DOM viewed by Customer Device 110 on Customer Service Device 120.

In some embodiments, the web application viewed at Customer Device 110 can transmit the currently displayed DOM, or at least information necessary to reproduce the DOM from Customer Device 110 to Customer Service Device 120 to reproduce the DOM at Customer Service Device 120.

In some embodiments, modifications to the DOM rendered at Customer Device 110 may be transmitted to Customer Service Device 120. Changes in the DOM can be detected by a mutation observer. The mutation observer is a module configured to trigger an event when the DOM is modified, such as the insertion, deletion, or modification of any element in the DOM. In some embodiments, the mutation observer can be the MutationObserver object defined in the DOM Standard promulgated by the Web Hypertext Application Technology Working Group (WHATWG). In some embodiments, the mutation observer can be configured to transmit changes made to the DOM on Customer Device 110 to Customer Service Device 120. For example, when an element is added, removed, or changed to the DOM viewed by Customer Device 110, information identifying the element's location and contents can be sent to Customer Service Device 120.

In some embodiments, the web application running on Customer Service Device 120 can receive information from Customer Device 110 to modify the DOM rendered by Customer Service Device 120. For example, Customer Service Device 120 can have a program module that receives information from Customer Device 110 indicating a change to the DOM, and, in response to that information, modify the DOM accordingly.

Figure 4:
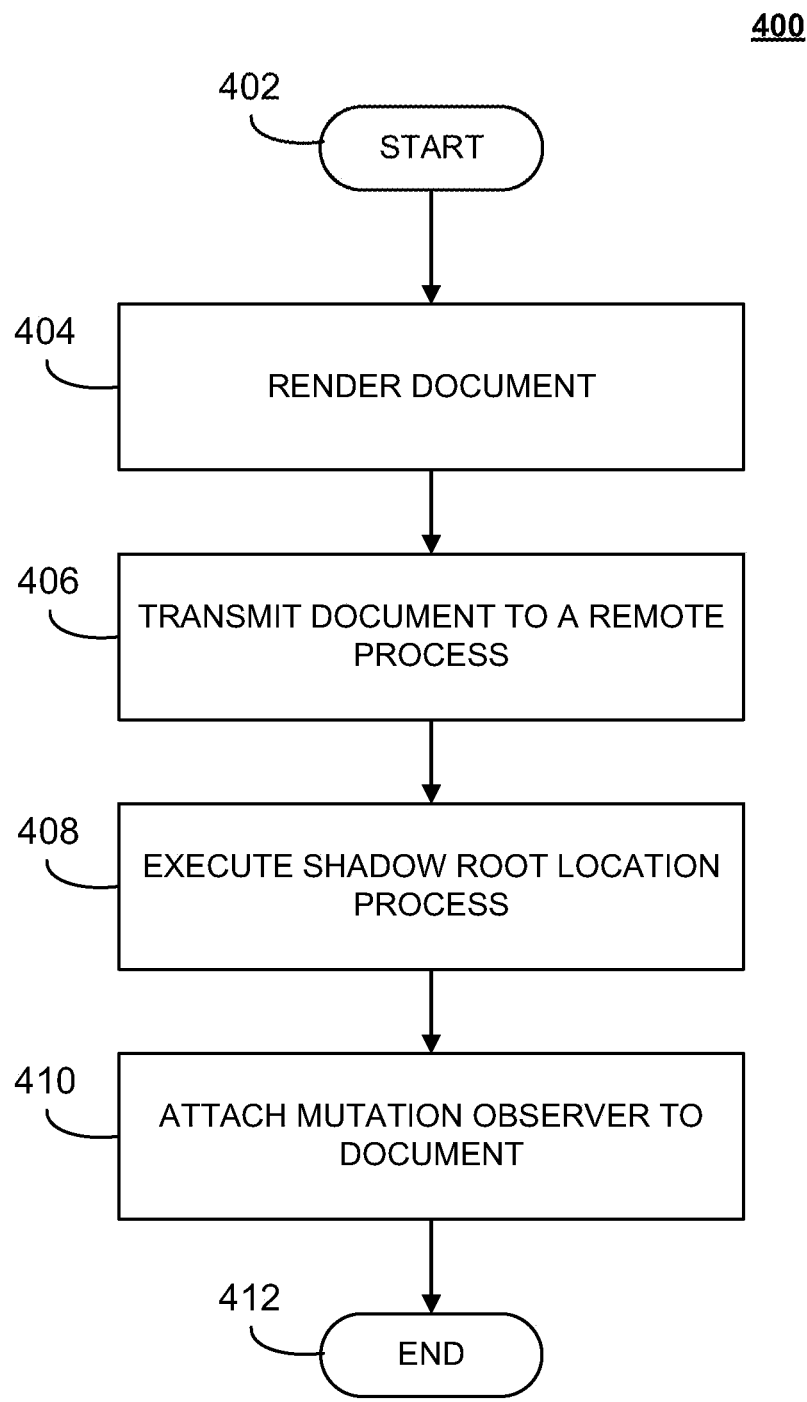
FIG. 4 is an example flow chart for initializing a co-browsing session in accordance with the disclosed technology.

FIG. 4 is an example flowchart of a program in accordance with an embodiment to be executed at a customer's device. First, the browser renders the document 304. This can include loading a module containing code that enables co-browsing. Then, the browser transmits the document to a remote process 406. The remote process 406 can be an application running on Customer Service Device 120, or a separate Co-Browsing Server 130. The step can be accomplished by transmitting a data representation of the Document Object Model as rendered by the browser. In some embodiments, the step can be accomplished by transmitting a URL corresponding to the website viewed at the customer's device. In some embodiments, additional information can be included with a URL to enable the customer service device to recreate the initial website displayed on the customer's device. This additional information can include a username, password, cookie information, API keys, or other credentials necessary to obtain the same information received by the customer's device.

Once the document is rendered in the customer's device, a process executes to locate shadow roots 408. This can be accomplished by checking elements of the DOM for the presence of a shadow root. In some embodiments, this can be accomplished, at least in part, by an event handler attached to an event corresponding to the addition of a shadow root to the DOM. For each shadow root identified in the DOM, a mutation observer is created and attached to the shadow root. This shadow root mutation observer will observe the contents of the shadow root.

Figure 5:
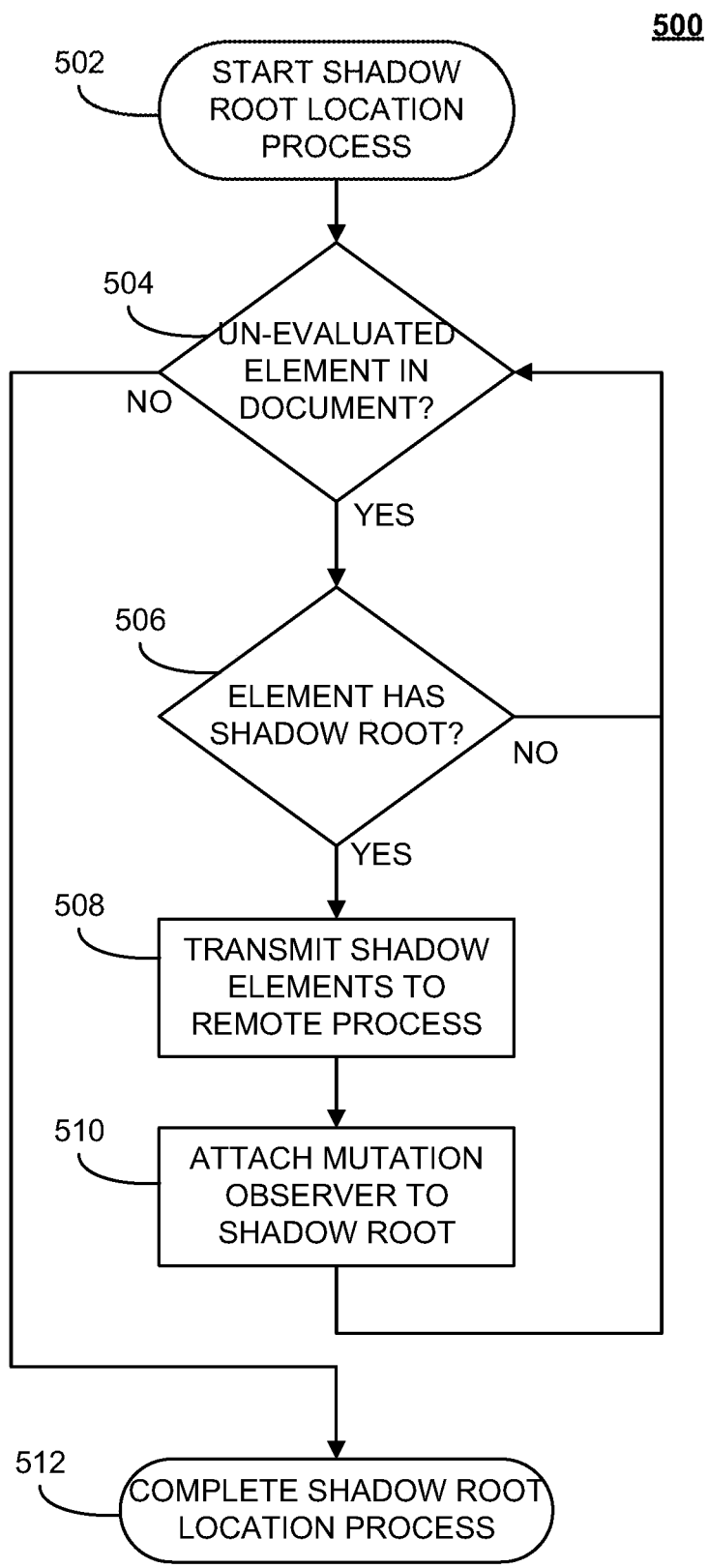
FIG. 5 is an example flow chart for a shadow root location process in accordance with the disclosed technology.

FIG. 5 depicts a process for identifying and attaching mutation observers to shadow roots. At block 504, the process begins by looking for un-evaluated elements in the document. At block 506, each un-evaluated element is examined for the presence of a shadow root. At block 508, if a shadow root is identified, the contents of the shadow root, comprising zero or more shadow elements, are transmitted to a remote process. At block 510, a mutation observer is attached to the shadow root to monitor the shadow root for any future changes. At block 512, this process repeats until all elements in the document have been evaluated.

Figure 6:
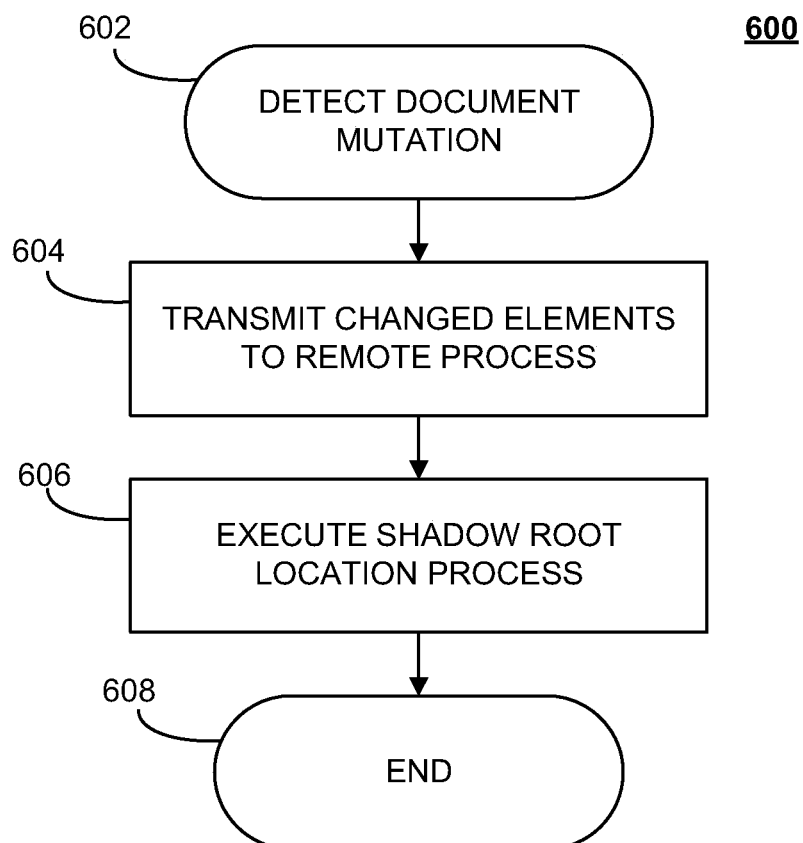
FIG. 6 is an example flow chart for a selective shadow root location process in accordance with the disclosed technology.

FIG. 6 depicts a process for repeating the process of FIG. 5 in response to a change in the top-level DOM. In some embodiments, a mutation observer is also attached to the top-level DOM. At block 602, when the mutation observer is attached to the top-level DOM, it can detect the insertion, deletion, or modification of elements in the DOM. At block 604, upon detection of such an event, the change to the top-level DOM is transmitted to a remote process. At block 606, the process depicted in FIG. 5 can be repeated to re-scan the entire DOM to locate shadow roots 604. At block 608, in some embodiments, a process can identify the subset of DOM elements affected by the change, and re-scan only those elements using a selective shadow root location process. Once the Shadow DOM location process is repeated, the process ends.

Figure 7:
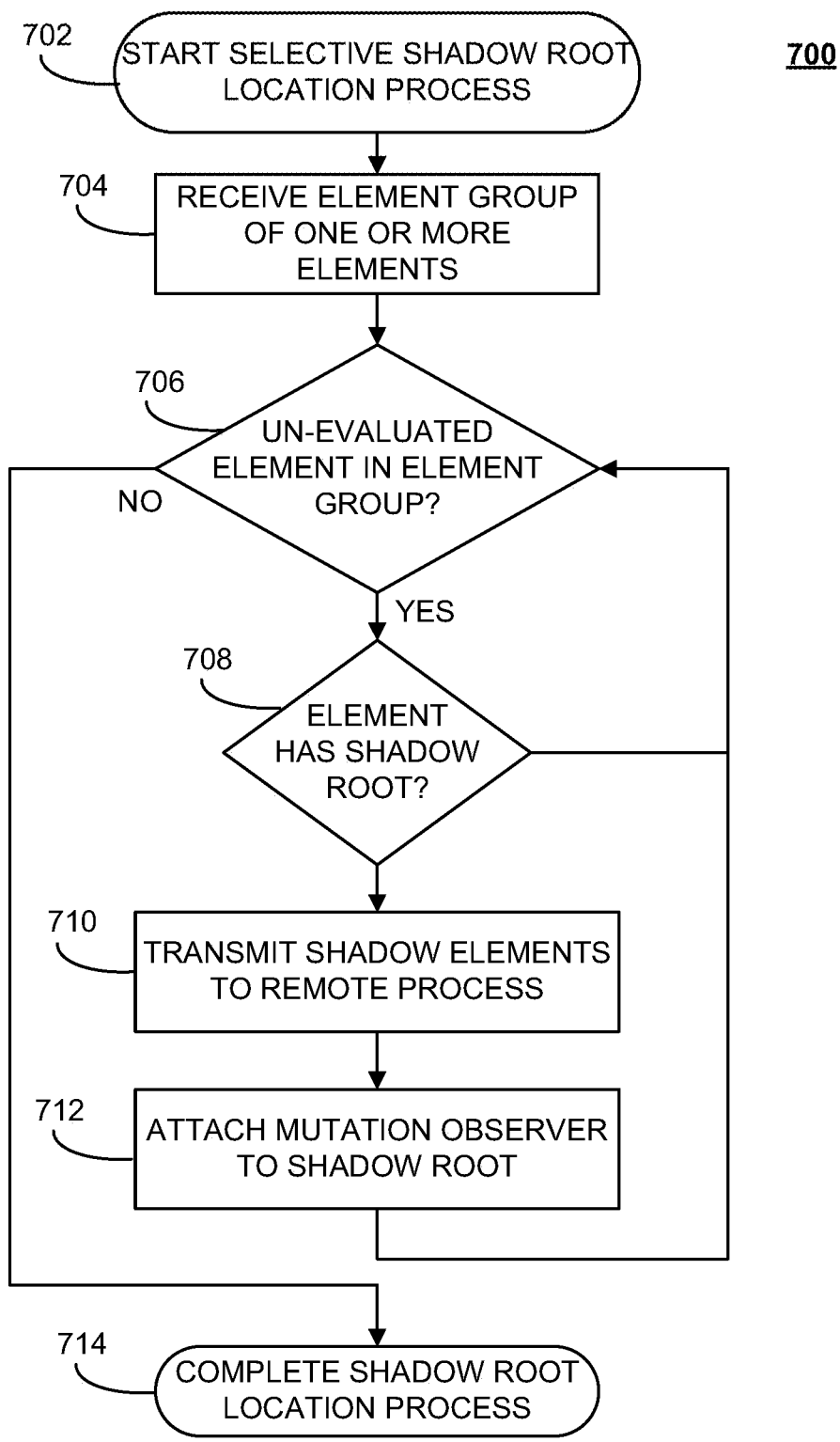
FIG. 7 is an example flow chart for handling the detection of a document mutation in accordance with the disclosed technology.

FIG. 7 depicts a process for selective shadow root location of a subset of DOM elements. At block 702, the process begins. At block 704, the process receives an element group of one or more elements. At block 706, each element is examined for the presence of a shadow root. At block 708, if a shadow root is identified, the process proceeds to block 710, where the contents of the shadow root, comprising zero or more shadow elements, are transmitted to a remote process. Additionally, at block 712, a mutation observer is attached to the shadow root to monitor the shadow root for any future changes. At block 714, this process repeats until all elements in the document have been evaluated.

Figure 8:
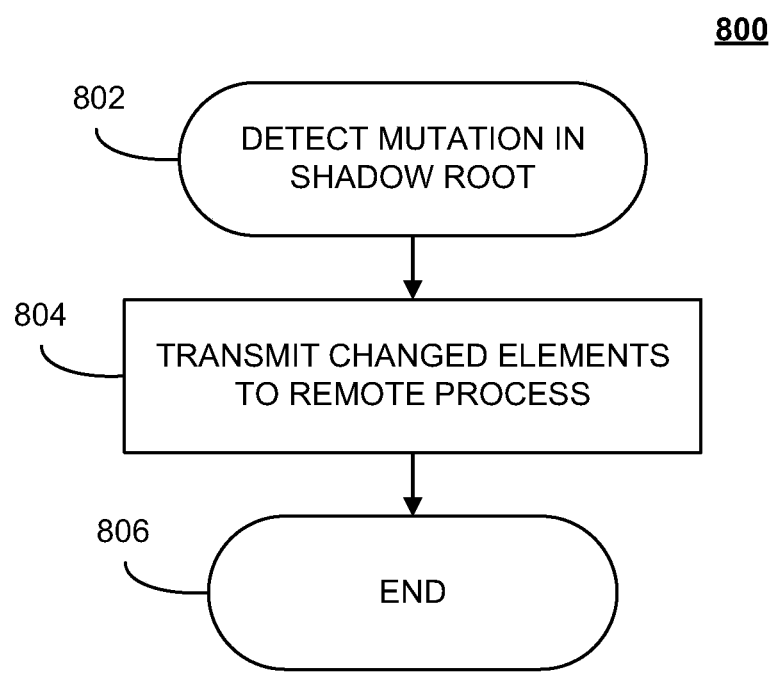
FIG. 8 is an example flow chart for handling the detection of a mutation in a shadow root in accordance with the disclosed technology

FIG. 8 depicts a process for responding to mutations within shadow roots. At block 802, the process is triggered by the detection of a mutation in the shadow root. At block 804, in response to the mutation, the change to the Shadow DOM is transmitted to a remote process. The process completes at 806.

For each step of transmitting changes to a remote process 406, 508, 604, 710, and 804, the changes can be transmitted in a variety of ways. In some embodiments, the changes are transmitted as soon as they are detected. These changes can be transmitted via an HTTP request, such as a POST request, or can be transmitted over a WebSockets connection between either Customer Device 110 and Co-Browsing Server 130, or directly from Customer Device 110 and Customer Service Device 120. In some embodiments, the web application on Customer Device 110 aggregates changes prior to transmission. In this manner, overhead associated with opening a TCP connection or forming an HTTP request can be minimized. For example, for each step of transmitting changes, the changes can be placed in a change queue in the web application running on Customer Device 110. In some embodiments, the web application can periodically transmit any changes in the queue to the remote process, such as after a period of time has elapsed, for example. In some embodiments, the web application can monitor the length of the change queue, and trigger a transmission to a remote process once the queue reaches a certain length. In some embodiments, the web application can monitor the length of the change queue, and when it stops increasing in size for a period of time, it can transmit the changes.

In some embodiments, the transmission of information from Customer Device 110 to Customer Service Device 120 can be intermediated by Co-Browsing Server 130, which runs co-browsing control logic 136. For example, Co-Browsing Server 130 can receive information from Customer Device 110 corresponding to the DOM originally rendered by the Customer Device 110, and then provide the information to Customer Service Device 120. In some embodiments, Co-Browsing Server 130 can receive information from Customer Device 110 corresponding to changes made to the DOM rendered by the Customer Device 110. In some embodiments, the original DOM, modifications to the DOM or both can be stored in a storage system 134 on the Co-Browsing Server 130, or in an external database 138. In some embodiments, the database can be a database such as a Microsoft® SQL databases, SharePoint® databases, Oracle® databases, Sybase™ databases, Postgres, MariaDB®, Couchbase™, Redis™, MongoDB® or other relational or non-relational databases.

In some embodiments, the Co-Browsing Server 130 can implement a Publish-Subscribe messaging model to receive DOM information from Customer Device 110 and provide it to one or more Customer Service Devices 120. That is, for each co-browsing session, Co-Browsing Server 130 will store a topic corresponding to the session. Messages containing DOM information received from Customer Device 110 can be stored in a topic corresponding to the session, and Customer Service Device 120 can subscribe to that topic. Co-Browsing Server 130 can then publish messages received from Customer Device 110 to Customer Service Device 120.

In some embodiments, the Co-Browsing Control Logic 136 can be implemented as a containerized web server. In some embodiments, the Co-Browswing Control Logic 136 can run within a container orchestration framework, such as, for example, a Docker Swarm or Kubernetes cluster. In some embodiments, the Co-Browsing Control Logic 136 can be scalable, allowing multiple containers to run simultaneously on Co-Browsing Server 130.

In some embodiments, Customer Service Device 120 can receive changes from Customer Device 110 or a Co-Browsing Server 130. The Customer Service Device 120 can then reproduce the DOM displayed at Customer Device 110 at Customer Service Device 120. In some embodiments, DOM information can be transmitted from Co-Browsing Server 130 to Customer Service Device 120 via a WebSockets connection, or via an HTTP request. In some embodiments, DOM information can be transmitted using HTTP long-polling.

Figures 9, 10, 11:
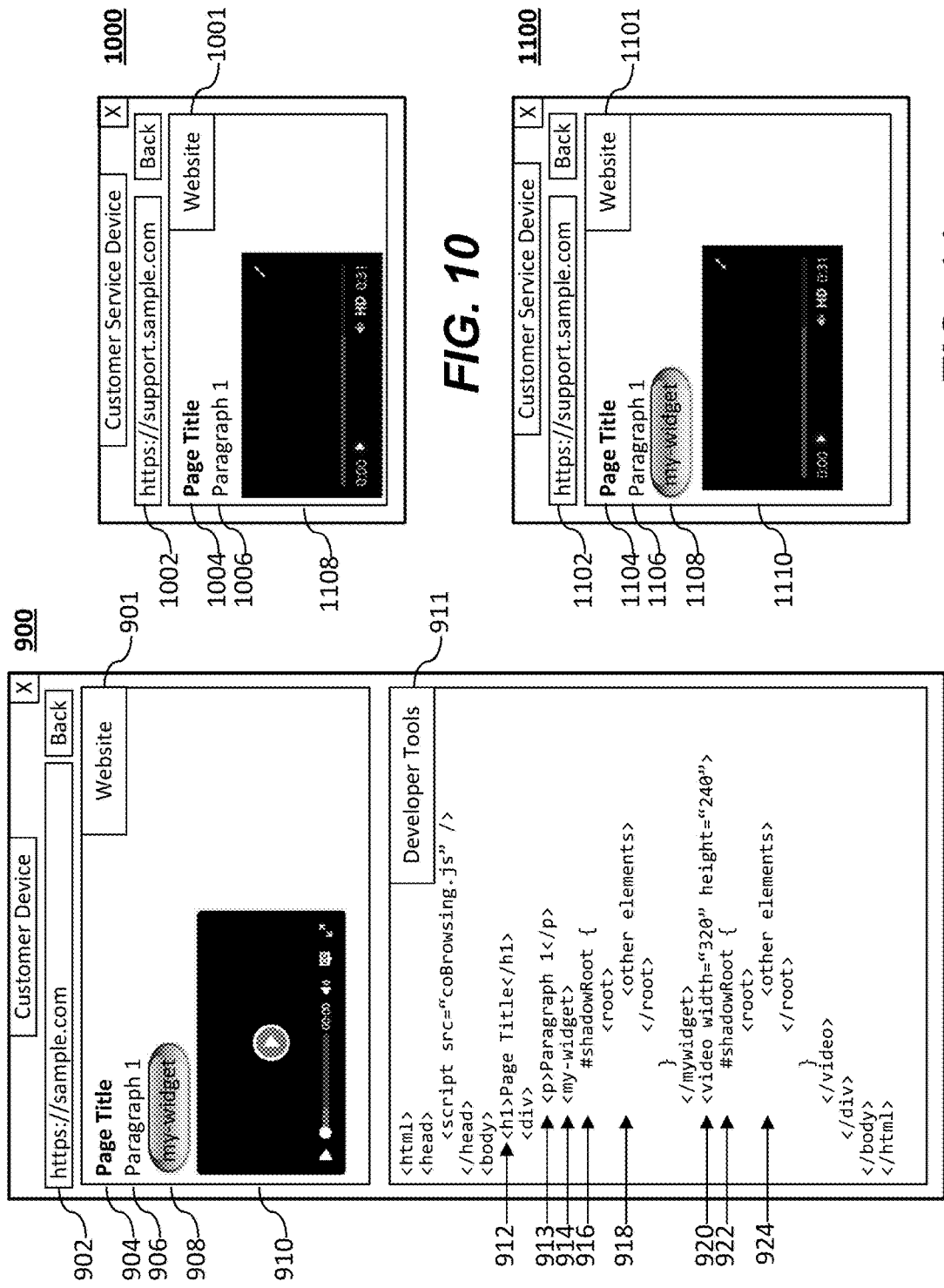
FIG. 9 is an illustration of a web browser displaying an HTML webpage that contains a plain text paragraph, a user-defined widget, and a multimedia tag.
FIG. 10 is an illustration of a web browser on a customer service device that received the webpage shown in FIG. 9 without information from the shadow root.
FIG. 11 is an illustration of a web browser on a customer service device that received the webpage shown in FIG. 9, including shadow root information.

FIGS. 9-11 illustrate the features of some embodiments. FIG. 9 depicts a webpage displayed in a browser 900 at Customer Device 110. In some embodiments, the web URL is shown in the address bar 902. Below the address bar 902, the website may be displayed in a main window 901. Here, for illustrative purposes, developer tools 911 are shown below the main window 901. Generally, Developer Tools does not show the original page source, but shows the status of the DOM as it is currently rendered. This example website includes a header element 904, a plain text paragraph 906, a user-defined widget 908, and a multimedia element 910.

Within Developer Tools 911, the plain elements for header element 912 and plain text paragraph 914 are shown. Additionally, user-defined widget 908 is implemented using a Shadow DOM 916. This is indicated in the developer tools as "#shadowRoot", and the DOM corresponding to the shadow root is displayed in brackets 918. This user-defined widget can be either an open or closed Shadow DOM, but here is an open Shadow DOM. The multimedia element 910 is shown in the <video> HTML 5 tag 920, which is implemented by this browser using a Shadow DOM. The video player rendered 910 is specific to the browser, and implements its own Shadow DOM. The video player could be implemented as an open or a closed Shadow DOM, but here is a closed Shadow DOM.

FIG. 10 depicts a browser 1000 on Customer Service Device 120 in a co-browsing session with Customer Device 110, without any of the Shadow DOM features of the present disclosed technology. The support URL is shown in the address bar 1002. Within a main window 1001, a header 1004 and a plain text paragraph 1006 are visible, but user-defined widget 908 is not displayed. While browser 1000 received the <my-widget> tag, it does not know how to handle the custom tag, and therefore does not display any content. Further, while video tag 920 is also sent to browser 1000, it is displayed using the player specific to that browser 1000, and may be dissimilar from the player shown on Customer Device 110.

FIG. 11 depicts a browser 1100 on a Customer Service Device 120 in a co-browsing session with Customer Device 110 with some of the Shadow DOM features of the present disclosed technology. As with the previous browser 1000, the support URL is shown in the address bar 1102, and the website is displayed in the main window 1101. Further, the plain text header 1104 and the plain text paragraph 1006 are also displayed as before. In addition, because the user-defined widget uses an open Shadow DOM, and the Web Application on Customer Device 110 transmitted Shadow DOM information about user-defined widget 908, the user-defined widget 1108 is displayed exactly as it is rendered on the Customer Device Browser 900. However, because the media player 910 is implemented using a closed Shadow DOM, the media player 1110 is still implemented using a browser-specific media player 1110 that may be dissimilar from that displayed in the customer's browser 900.

Figure 12:
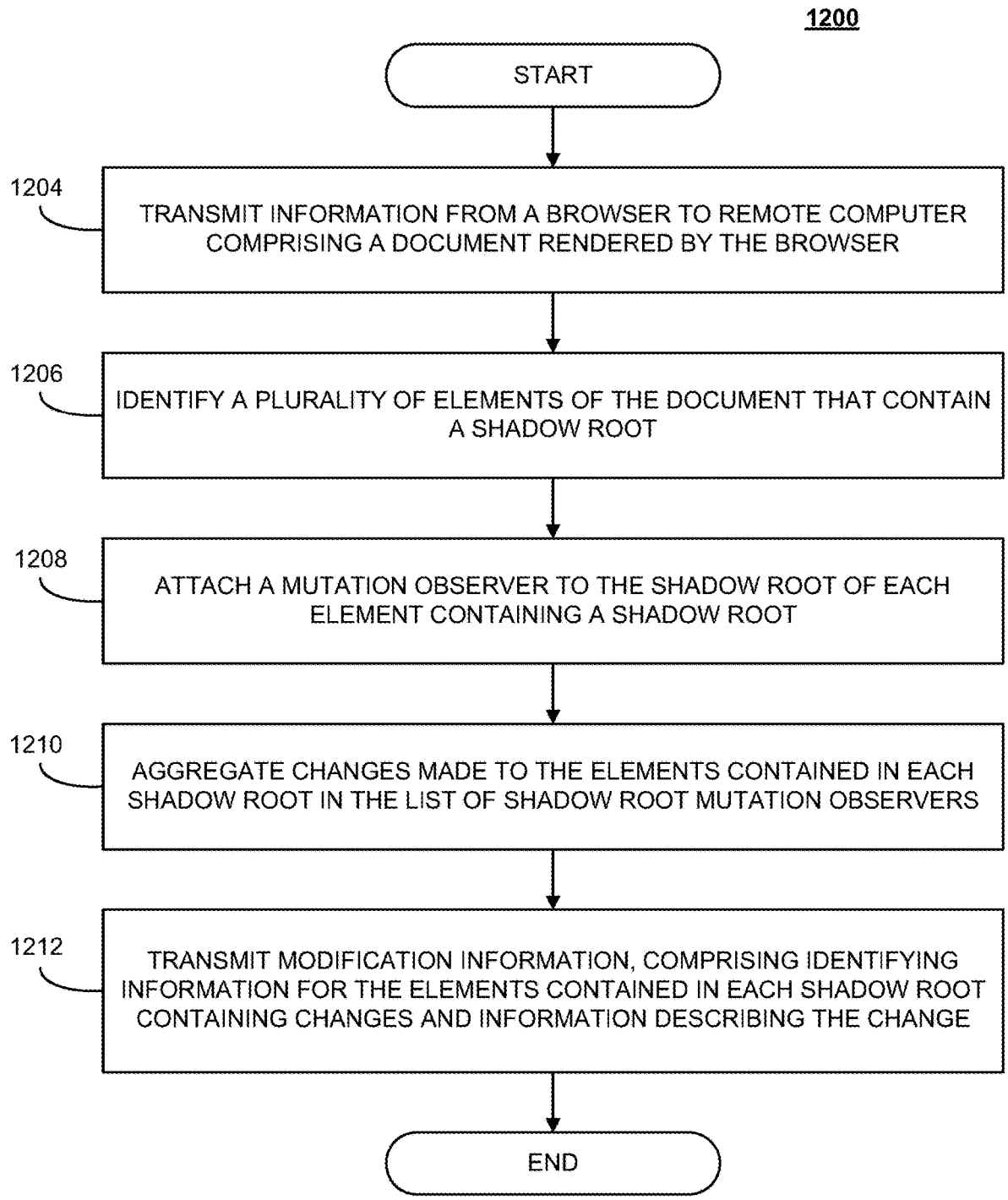
FIG. 12 is an example flow chart for a method of co-browsing in accordance with the disclosed technology

FIG. 12 illustrates a method in accordance with an embodiment 1200. At block 1204, information is transmitted from a browser to a remote computer comprising a document rendered by the browser. At block 1206, the method further includes identifying a plurality of elements of the document that contain a shadow root. At block 1208, the method further includes the step of attaching a mutation observer to the shadow root of each element containing a shadow root. At block 1210, the method further includes aggregating changes made to the elements contained in each shadow root in the list of shadow root mutation observers. At block 1212, the method additionally includes transmitting modification information comprising identifying information for the elements contained in each shadow root containing changes and information describing the change 1212.

Example Use Cases

The following exemplary use cases describe examples of possible implementations of the disclosed technology. They are intended solely for explanatory purposes and not in limitation. A web application using a co-browsing method in accordance with the disclosed technology (e.g. web page 146, 148) can include a software module, such as a Javascript file, that is transmitted to their computing device (e.g. Customer Device 110). When a customer directs their browser (e.g. program 230) to the web application, the software module is transmitted from a server (e.g. Web Server 140) to the customer computing device (e.g. Customer Device 110), and incorporated into the web application (e.g. program 230). For example, a user could log into a banking web application to view their accounts. If the user needs assistance, a link is provided to request customer support (e.g. via web page 146, 148). For example, the user may be looking for information regarding their 401(k) account, which they cannot locate. When the link is clicked, a user support session begins, and the customer is connected with a customer support agent (using, e.g. a Customer Service Device 120), such as through a chatbox displayed in the browser. The customer service agent can then request a co-browsing session to view the banking web application.

When the customer approves, the web application running on the customer's device traverses the DOM displayed, and identifies each shadow DOM root within the top-level DOM (e.g. using the method of FIG. 4). The contents of the top-level DOM and each shadow DOM are then transmitted to the customer service device (e.g. step 406), where they are rendered (e.g. via a program 230 running at Customer Service Device 120). Thus, the customer service device displays the same initial page as is displayed at the customer device.

As the web application traverses the DOM, the system (e.g., Customer Device 110) attaches a Mutation Observer to the top-level DOM (e.g. step 410), and attaches a Mutation Observer to each shadow root attached to each shadow DOM (e.g. step 408 and/or the process of FIG. 5). The web application also creates a change queue that contains all modifications to the DOM. A callback function is provided to the Mutation Observer of each Shadow DOM to enable it to fill the queue with information to identify the location of the Shadow DOM, and all changes made to the Shadow DOM. Likewise, a callback function is provided to the Mutation Observer to the top-level document that allows it to fill the queue with all changes made to the top-level DOM. In addition, when the Mutation Observer attached to the top-level DOM detects a change, it deletes all mutation observers attached to Shadow DOM's, and repeats the process of traversing the DOM, identifying Shadow DOM's, and attaching Mutation Observers with callback functions to populate the change queue (e.g. the process of FIG. 5 or FIG. 6).

Periodically, the web application inspects the Change Queue. If the Change Queue is not empty, the web application sends a POST HTTP request to a co-browsing server application that contains the contents of the change queue. the co-browsing service application (e.g. Co-Browsing Control Logic 136) will receive the POST request, decode the changes from the change queue, and add them to an internal change queue. For example, the co-browsing server can have a Redis™ database (e.g. Co-Browsing Server Memory 134 or External Database 138) that has a unique key assigned to the co-browsing session. POST requests containing information for a particular co-browsing session are added to a list associated with the unique key for the co-browsing session.

The customer service agent's device runs a web application (e.g. via program 230 of Customer Service Device 120) that is configured to mimic, at least in part, the DOM displayed at the customer's device (e.g. Customer Device 110). For example, the interface displayed to a customer service agent may include a frame within which the screen displayed at the customer's device will be rendered, a frame that includes a chatbox for communicating with the Customer, and a frame containing a customer service model. The web application at the customer service agent's device (e.g. Customer Service Device 120) can open a WebSockets connection to the co-browsing server (e.g. Co-Browsing Server 130), and subscribe to the list associated with the unique key for the co-browsing session. As changes are received by the co-browsing server from the customer device, the co-browsing server immediately pushes the changes to customer service agent's device (e.g. Customer Service Device 120). As the customer service agent's device receives changes from the co-browsing server, the web application at the customer service agent's device (e.g. program 230 running on Customer Service Device 120) modifies the displayed content in the Customer Device frame to match the content displayed at the Customer Device.

Once the co-browsing session is set up, the customer service agent can see what the customer is viewing, and direct them to the page that contains their 401(k) information. The customer can then click on the link and go to that information, while the customer service agent watches to ensure the correct steps are followed. Further, because the customer service agent can see what the customer sees, they can correctly direct the customer from wherever they are in the application to the appropriate information or action. Once the customer is satisfied that they have located the information or feature they are looking for, the user or customer service agent can terminate the co-browsing session.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

The invention claimed is:

1. A method for co-browsing, comprising the steps of:
    parsing, using a browser displaying a document on a first computing device, a HTML5 web component;
    producing a Document Object Model (DOM) tree data structure from the parsed HTML5 web component;
    identifying, in the DOM tree data structure and by the first computing device, a plurality of shadow roots, each with corresponding shadow elements;
    attaching a mutation observer module to each shadow root of the plurality of shadow roots;
    detecting, with the mutation observer module, a change in a shadow root of the plurality of shadow roots;
    transmitting, from the first computing device directly to a second computing device, identifying information of a shadow element of the shadow elements corresponding with the changed shadow root and a copy of the shadow element;
    transmitting, from the first computing device directly to the second computing device, and in response to a detected change in the shadow element, the identifying information of the shadow element and shadow element change information describing the detected change in the shadow element;
    aggregating changes detected by the attached mutation observers of the plurality of shadow roots by requesting modification information from each of the attached mutation observers;
    adding the modification information to a queue; and
    periodically transmitting the modification information in the queue directly to the second computing device according to queue transmission criteria.

2. The method of claim 1, wherein the identifying information of the shadow element is an identification number in a custom attribute.

3. The method of claim 1, wherein the step of transmitting identifying information of the shadow element and the copy of the shadow element comprises sending data through a WebSockets connection.

4. The method of claim 1, wherein the step of transmitting identifying information of the shadow element and the copy of the shadow element comprises sending data via an AJAX request.

5. The method of claim 1, wherein the queue transmission criteria comprise at least one transmitting of:
    transmitting the obtained modification data in the queue to the second computing device once the queue reaches a certain length; and
    transmitting the obtained modification data in the queue to the second computing device once a time period has elapsed since the queue last changed in size.

6. A method for co-browsing, comprising the steps of:
    transmitting a document rendered by a browser of a first computer to a remote computer;
    producing, by the first computer, a Document Object Model (DOM) tree data structure from a parsed HTML5 web component of the document;
    identifying, from the DOM tree data structure, a plurality of HTML5 elements of the document that contain a shadow root;
    attaching a mutation observer to the shadow root of each of the identified elements containing a shadow root;
    aggregating changes detected by the shadow root mutation observers for each of the identified elements containing a shadow root; and
    transmitting, to the remote computer, modification information comprising identifying information for the identified elements and change information associated with the changes detected by the shadow root mutation observers for each of the identified elements containing a shadow root;
    wherein the step of aggregating changes comprises:
        requesting modification information from each of the shadow root mutation observers; and
        adding obtained modification information to a queue; and
    wherein the step of transmitting modification information comprises periodically transmitting the obtained modification information in the queue to a remote server according to queue transmission criteria.

7. The method of claim 6, wherein the step of identifying the plurality of HTML5 elements of the document comprises inspecting each node in the document to determine if an HTML5 element of the plurality of HTML5 elements contains a shadow root.

8. The method of claim 6, wherein the step of aggregating changes comprises providing a callback function to each of the shadow root mutation observers to add observed mutations to a queue.

9. The method of claim 6, further comprising the step of: adding a reference to a first HTML5 element of the plurality of HTML5 elements containing a shadow root and a reference to a first shadow root mutation observer of the shadow root mutation observers.

10. The method of claim 6, wherein the step of transmitting modification information comprises transmitting a string containing a modified HTML5 element and all child elements of the modified HTML5 element.

11. The method of claim 6, wherein the step of periodically transmitting the obtained modification data in the queue to a remote server according to queue transmission criteria further comprises at least one transmitting of:
transmitting the obtained modification data in the queue to the remote server once the queue reaches a certain length; and
transmitting the obtained modification data in the queue to the remote server once a time period has elapsed since the queue last changed size.

12. The method of claim 6, further comprising:
attaching a mutation observer to a root of the document; and
in response to detecting a change via the document root mutation observer, repeating the step of identifying the plurality of HTML5 elements of the document containing a shadow root.

13. The method of claim 6, wherein the step of transmitting modification information further comprises transmitting changes made to all HTML5 elements in the document.

14. The method of claim 6, wherein the step of identifying a plurality of HTML5 elements of the document that contain a shadow root comprises performing a depth-first search of the DOM tree data structure.

15. The method of claim 6, wherein the identifying a plurality of HTML5 elements of the document that contain a shadow root comprises performing a breadth-first search of the DOM tree data structure.

16. A method for co-browsing, comprising the steps of:
transmitting a software module from a server to a first remote computing device, wherein the software module causes a browser at the first remote computing device to perform the steps of:
transmitting a document rendered by the browser running on the first remote computing device to a second remote computing device;
producing, by the first remote computing device, a Document Object Model (DOM) tree data structure from a parsed HTML5 web component of the document;
identifying, from the DOM tree data structure, a plurality of HTML5 elements of the document that contain a shadow root;
attaching a mutation observer to the shadow root of each of the identified elements containing a shadow root;
aggregating changes detected by the attached mutation observers for each of the identified elements containing a shadow root by requesting modification information from the attached mutation observers; and
transmitting the modification information comprising identifying information for the identified HTML5 elements and change information associated with the changes detected by the shadow root mutation observers for each of the identified HTML5 elements containing a shadow root;
wherein the step of aggregating changes comprises providing a callback function to each of the shadow root mutation observers to add observed mutations to a queue; and
wherein the transmitting modification information further comprises periodically transmitting obtained modification data in the queue to the server according to queue transmission criteria.

17. The method of claim 16, wherein the step of identifying the plurality of HTML5 elements of the document comprises inspecting each node in the document to determine if an HTML5 element of the plurality of HTML5 elements contains a shadow root.

18. The method of claim 16, wherein the queue transmission criteria comprises at least one transmitting of: transmitting the obtained modification data in the queue to the remote server once the queue reaches a certain length; and transmitting the obtained modification data in the queue to the remote server once a time period has elapsed since the queue last changed size.

* * * * *